United States Patent
Lewis et al.

(10) Patent No.: US 10,550,870 B2
(45) Date of Patent: Feb. 4, 2020

(54) HIGH TEMPERATURE BUSHINGS FOR SECURING SENSORS, WIRES AND OTHER OBJECTS AND METHODS OF MAKING THE SAME

(71) Applicant: MEGGITT SAFETY SYSTEMS, INC., Simi Valley, CA (US)

(72) Inventors: Randall Lewis, Simi Valley, CA (US); Grigor Kerdanyan, Van Nuys, CA (US)

(73) Assignee: MEGGITT SAFETY SYSTEMS, INC., Simi Valley, CA (US)

( * ) Notice: Subject to any disclaimer, the term of this patent is extended or adjusted under 35 U.S.C. 154(b) by 0 days.

(21) Appl. No.: 15/462,777

(22) Filed: Mar. 17, 2017

(65) Prior Publication Data
US 2018/0266458 A1   Sep. 20, 2018

(51) Int. Cl.
 *F16B 2/24*   (2006.01)
 *F16L 3/137*  (2006.01)
 *F16L 3/13*   (2006.01)

(52) U.S. Cl.
 CPC .............. *F16B 2/245* (2013.01); *F16L 3/13* (2013.01); *F16L 3/137* (2013.01)

(58) Field of Classification Search
 CPC ... F16B 2/243; F16B 2/245; F16L 3/13; F16L 3/137; H02G 3/32; B60R 16/0215
 USPC ............................................. 16/2.1; 248/74.1
 See application file for complete search history.

(56) References Cited

U.S. PATENT DOCUMENTS

| | | | |
|---|---|---|---|
| 1,711,730 A | 5/1929 | Gibson | |
| 2,166,916 A | 7/1939 | Lombard | |
| 2,453,980 A | 11/1948 | Hartman | |
| 3,054,587 A * | 9/1962 | Hebenstreit | F16L 3/1233 248/74.1 |
| 3,216,685 A * | 11/1965 | Raymond | F16B 2/245 248/316.7 |
| 4,144,616 A * | 3/1979 | Gould | H02G 3/083 16/2.1 |
| 4,189,810 A | 2/1980 | Beziat | |
| 4,295,618 A * | 10/1981 | Morota | F16L 3/237 248/73 |
| 5,079,389 A * | 1/1992 | Nelson | H02G 3/22 16/2.1 |

(Continued)

FOREIGN PATENT DOCUMENTS

| | | |
|---|---|---|
| FR | 2 909 153 A1 | 5/2008 |
| GB | 919417 | 2/1963 |

*Primary Examiner* — Jeffrey O'Brien
(74) *Attorney, Agent, or Firm* — Hackler Daghighian Martino & Novak

(57) ABSTRACT

A bushing primarily for use in high temperature applications. In preferred embodiments the bushing comprises a rounded body formed from a single piece of metal wherein the body has an "M" shaped cross-section with a first outer leg, second outer leg, first inner leg and second inner leg, and wherein the first outer leg and second outer leg are both concave arcs about a central axis and form an outer circumference of the rounded body and wherein the first inner leg and second inner leg each have an arc formed in the leg to create a rounded channel that extends a longitudinal length of the rounded body along the central axis; and wherein the first inner leg and second inner leg transition between each other in a third concave arc.

19 Claims, 5 Drawing Sheets

(56) References Cited

U.S. PATENT DOCUMENTS

| | | | | |
|---|---|---|---|---|
| 5,896,720 | A * | 4/1999 | Bond | E04D 13/12 24/336 |
| 6,056,245 | A * | 5/2000 | White | H02G 3/30 174/135 |
| 6,070,837 | A * | 6/2000 | Bond | F16L 3/13 248/71 |
| 7,540,454 | B2 * | 6/2009 | Gauger | H02G 3/32 248/68.1 |
| 8,033,512 | B2 * | 10/2011 | Lien | F16B 5/0685 248/74.1 |
| 8,662,455 | B2 * | 3/2014 | Hernandez | F16B 2/245 248/222.12 |
| 9,288,922 | B2 * | 3/2016 | Liu | H05K 5/0247 |
| 9,494,258 | B2 * | 11/2016 | Flynn | F16L 3/237 |
| 2002/0130237 | A1 * | 9/2002 | Kluser | F16B 5/0685 248/316.1 |
| 2006/0273226 | A1 * | 12/2006 | Jatzke | F16L 3/223 248/68.1 |
| 2009/0026673 | A1 * | 1/2009 | Clark | F16B 5/0685 267/140.11 |
| 2012/0236543 | A1 * | 9/2012 | Torgerson | F16B 9/023 362/106 |
| 2015/0300531 | A1 * | 10/2015 | Schmidt | F16L 3/1041 248/74.2 |
| 2015/0306305 | A1 * | 10/2015 | Kluttz | A61M 5/1418 248/219.4 |
| 2016/0186609 | A1 * | 6/2016 | Holland | F16B 43/00 428/223 |
| 2016/0377200 | A1 * | 12/2016 | Haynes | F16L 3/137 248/74.1 |
| 2017/0328393 | A1 * | 11/2017 | Lamouche | F16B 2/245 |

\* cited by examiner

HIGH TEMPERATURE BUSHINGS FOR SECURING SENSORS, WIRES AND OTHER OBJECTS AND METHODS OF MAKING THE SAME

FIELD

The present patent document relates generally to bushing inserts and methods of making the same. More specifically, the present patent document relates to a high temperature bushing inserts for holding sensors, cables and other objects in clamps and methods for making the same. In preferred embodiments, the bushing inserts are designed to secure sensors, cables or other objects in a clamp in a high temperature situation.

BACKGROUND

In many applications, sensors, thermistors, wires, cables, cabling or other objects need to be secured by clamps. In situations where temperatures are extremely high, standard bushing cannot be used. For example, above 600° F. Teflon bushings cannot be used. To this end, in applications where bushings are needed to be used in conjunction with clamps, bushings must be made of metal or other heat resistant materials.

FIG. 1 illustrates a dual clamp with two bushings of a previous design rigidly affixed to the clamp. As may be seen in FIG. 1, the two metal bushings 20, each sit on one side of the clamp 10. Each bushing 20 is comprised of two pieces 22 and 24. Top portion 22 is doubled over on itself and has a pair of tabs 22 that each wrap around the edge of the top portion of the clamp 10. Bottom portion 24 of the bushing 20 is also doubled over on itself but has a long tongue portion 24A that extends up secure around the rod of hinge 28 of clamp 10. To this end, bushing 20 is rigidly affixed to clamp 10. Moreover, the bushing 20 is custom designed for clamp 10 and is not necessarily compatible with other types of clamps. In addition, the clamp 10 must be disassembled at hinge 28 in order to attach the bushing 20 to the clamp 10. This causes potential damage to the clamp 10.

FIG. 2 illustrates a p-type clamp with a bushing of a previous design, similar to the design of the bushings in FIG. 1, rigidly affixed to the clamp. The current bushing designs for these high temperature applications are inadequate, expensive, and have a long lead time. In particular, the requirement of reworking the clamps to rigidly attach the bushings is cumbersome and creates inconsistency. A better bushing design for high temperature applications is needed.

SUMMARY OF THE EMBODIMENTS

Objects of the present patent document are to provide an improved bushing design. In particular, objects of the present patent document include providing an improved bushing design for high temperature applications. The bushings are designed to be used in clamps of various designs and secure sensors, thermistors, cables, wires, tubes or other objects securely in the clamp. Preferably, the new design eliminates or at least ameliorates some of the problems with the existing bushing designs explained above.

To this end, a new bushing design is provided. In one embodiment, the bushing comprises a body formed from a single piece of metal the body having an "M" shaped cross-section with a first outer leg, second outer leg, first inner leg and second inner leg, wherein the first outer leg and second outer leg are both concave arcs about a central axis and form an outer circumference of the body and wherein the first inner leg and second inner leg each have an arc formed in the leg to create a rounded channel that extends a longitudinal length of the body along the central axis; and wherein the first inner leg and second inner leg transition between each other in a third concave arc. The rounded channel formed by arcs of the inner legs is used to secure the sensors, cables, thermistors, wires, tubes or other objects within the clamp.

In yet another embodiment, a bushing is provided that is formed from a single piece of metal with an "S" shaped cross-section wherein the "S" shaped cross-section has an additional element added to the tail of the "S". The center portion of the "S" shaped cross-section and the additional element added to the tail run parallel to each other across an interior of the bushing and have opposing arcs that form the central passage for holding sensors, tubes, wires, cables or other elements.

In yet another embodiment, another bushing is provided that is formed from a single piece of metal with an arc that sweeps through 320 degrees or more where the arc defines the outer cylindrical shape of the bushing. A rounded interior passage is formed by opposing arcs in the interior of the bushing where each end of the outer arc turns inward and across the interior of the bushing.

DETAILED DESCRIPTION OF THE PREFERRED EMBODIMENTS

The present patent document discloses embodiments of a bushing for use in securing wires, cables, sensors, thermistors, tubes or other objects within clamps. The bushings are particularly designed for high temperature applications. An example of a high temperature application is temperatures above 600° F. Under such conditions, typical Teflon bushings will melt and thus, a more robust bushing is needed. The embodiments of bushings disclosed herein are designed for use in these high temperature applications.

In preferred embodiments, the high temperature bushing/insert is a formed part and may be formed from a thin sheet metal. However, in other embodiments, the bushing may be extruded. The bushings can be used in any type of existing clamps, such as p-clamps or dual sensor clamps. The high temperature bushing is designed to snap on to and stay attached to the tubing prior to the installation of the clamp. In preferred embodiments, the bushing is also designed to prevent lateral movement in the clamp and has a strain/stress relief feature to prevent chafing of the supported element.

The bushing can be made from any corrosion and heat resistant material. In preferred embodiments, the bushing is made from a metal, for example, stainless steel, Inconel, aluminum or other type of metal.

Figure 1:
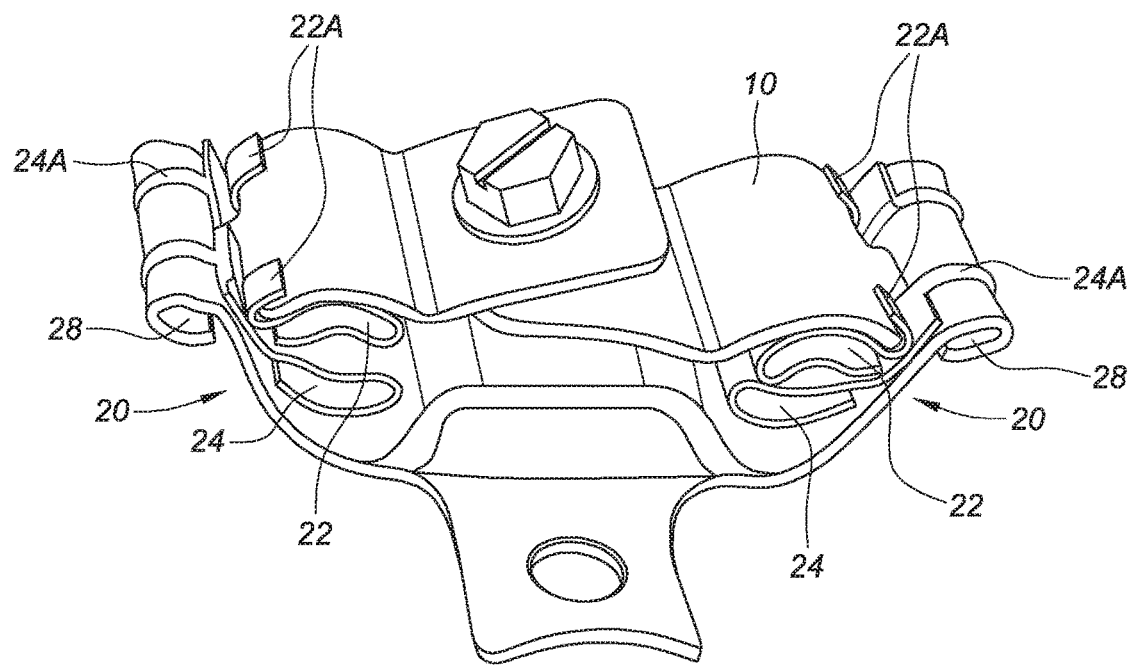
FIG. 1 illustrates a dual clamp with two bushings of a previous design rigidly affixed to the clamp.
Figure 2:
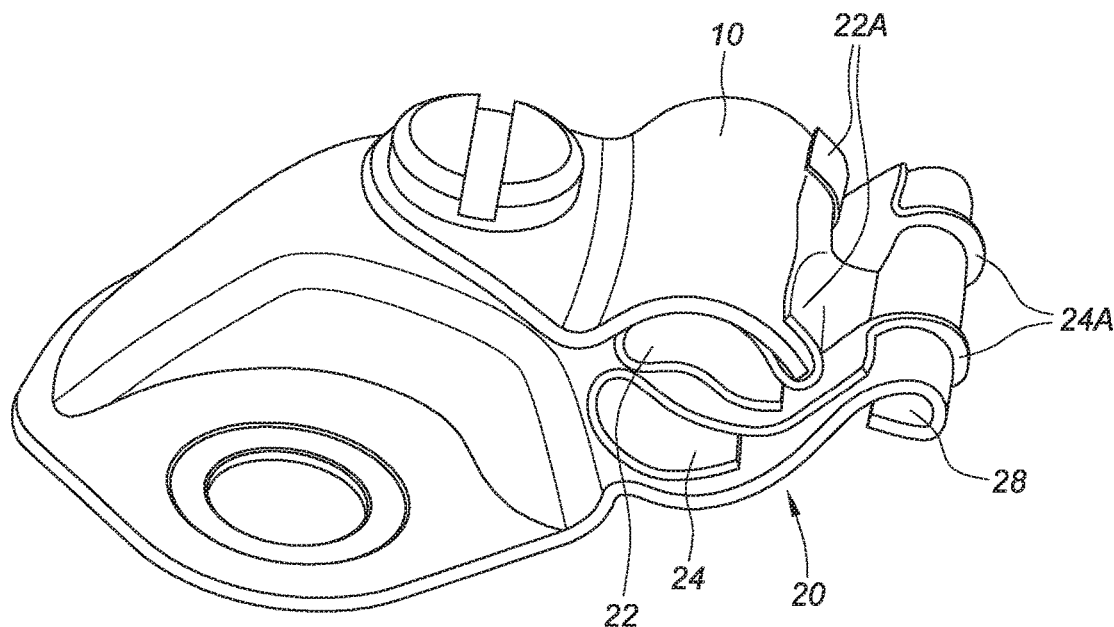
FIG. 2 illustrates a p-type clamp with a bushing of a previous design, similar to the design of the bushings in FIG. 1, rigidly affixed to the clamp.
Figure 3:
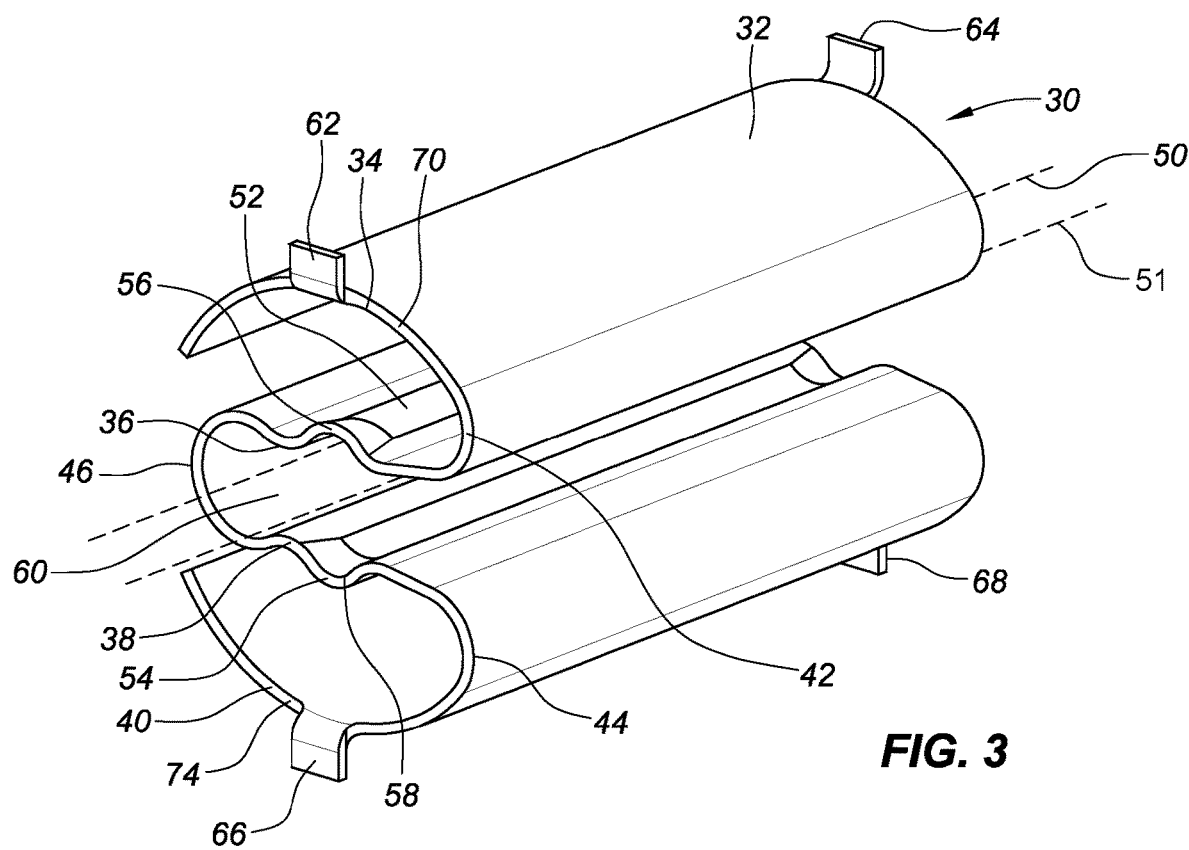
FIG. 3 illustrates one embodiment of a bushing design accordingly to the teachings of the present patent document.

FIG. 3 illustrates one embodiment of a bushing 30 accordingly to the teachings of the present patent document. The bushing 30 has a generally rounded body 32. The overall shape of the body 32 of bushing 30 is cylindrically shaped although the cylinder formed by the body does not have a continuous outer wall.

As may be seen in FIG. 3, in some embodiments, the body 32 of bushing 30 has an "M" shaped cross-section with a first outer leg 34, second outer leg 40, first inner leg 36 and second inner leg 38. In preferred embodiments, the first outer leg 34 and second outer leg 40 are both concave arcs about a central axis 51 and define an outer circumference of the rounded body 32.

Although the cross-section of the embodiment shown in FIG. 3 is generally "M" shaped, it has rounded corners. For example, where the first outer leg 34 transitions to the first inner leg 36 a rounded corner 42 or arc is formed. Similarly, where the second outer leg 40 transitions into the second inner leg 38 a second corner 44 or arc is formed. In preferred embodiments, the first rounded corner 42 and second rounded corner 44 have the same or similar radius of curvatures and sweep through the same arc. In preferred embodiments, the first rounded corner 42 and second rounded corner 44 are identical mirror images of each other. In addition to the first rounded corner 42 and second rounded corner 44, bushing 30 also has a third concave arc 46 where the first inner leg 36 transitions to the second inner leg 38.

In some embodiments, the third concave arc 46 is an arc through 180 degrees or more around a longitudinal axis 50. This creates a rounded curve. In other embodiments, the third concave arc 46 may pass between 150 and 180 degrees.

In the embodiments with an "M" shaped cross-section the first inner leg and second inner leg each have an arc 52 and 54 formed in the leg to create a rounded channel 60 that extends a longitudinal length of the rounded body 32 along the central axis 51. The rounded channel 60 is designed to mate with the cable, wire, sensor, thermistor or other object held by the bushing. In preferred embodiments, the size and shape of the central channel 60 is designed to create an interference fit with the cable, wire, sensor or other object. The interference fit between the bushing and the cable, wire, thermistor, sensor or other object will allow the bushing to clip-on to the object while the clamp is being installed.

Depending on the material used, the central channel may also apply a spring force on the object being held. For example, if the diameter of the object placed in the bushing 30 is slightly larger than the diameter of the rounded channel 60, the two halves of the bushing 30 may be slightly pulled apart by bending the bushing 32 at the third concave arc 46 and placing the item in the rounded channel 60. Assuming the appropriate material is used for the bushing 32, the third concave arc 46 will apply a spring force against the object placed in the rounded channel 60.

In some embodiments, the radius of the rounded channel 60 and the radius of the third concave arc 46 are about the same. This allows the first inner leg 36 and second inner leg 38 to be approximately parallel to each other or only slightly converging or diverging. In many embodiments, the first inner leg 36 and second inner leg 38 are within 10 degrees of parallel and even more preferably within 5 degrees of parallel.

In preferred embodiments, the bushings include tabs 62, 64, 66 and 68 on opposite ends of the body 32 of the bushing 30. These tabs may be on both the top and bottom of the bushing 30 or in some embodiments, only a single set of tabs, for example 62 and 64 on either the top or bottom of the bushing 30. Although the embodiments shown have four tabs, any number of tabs may be used. In some embodiments, 8 tabs, four on each end, may be used. In yet other embodiments, six, ten, twelve, fourteen or sixteen tabs may be used.

The tabs prevent the bushing from moving laterally within the clamp when they are assembled together. The tabs are designed to stick out and away from the body of the bushing on either side of the clamp the bushing is assembled to such that the bushing cannot slide along the longitudinal axis in either direction.

To this end, a preferred embodiment of a bushing 30 includes a first tab 62 and a second tab 64 on opposite ends of the first outside leg 34 and extending outwards from a first outside edge 70 of the first outside leg 34 and a third tab 66 and a fourth tab 68 on opposite ends of the second outside leg 40 and extending outwards from a second outside edge 74 of the second outside leg 40.

In preferred embodiments, the rounded channel 60 has a flared lip 56 and 58 (the flared lip on the opposite end of the body 32 of bushing 30 is not shown in FIG. 3) on both ends of the body. The flared lip is created at the edge of each arc 52 and 54 at both ends of the rounded channel 60. The flared lips 56 and 58 provide strain relief to whatever the bushing is assembled to.

In the embodiment shown in FIG. 3, the bushing 30 is symmetric about a central plane through the central axis 51 and the longitudinal axis 50.

In preferred embodiments, the bushing is a one-piece design. However, other embodiments may use a two-piece design. In yet other embodiments, even more pieces may be used. As used herein, a one-piece design means the entire body of the bushing is made from a single piece. That tabs 62, 64, 66 and 68 are not required to be made from the same piece of metal to satisfy the one-piece design criteria as used herein. In preferred embodiments, tabs 62, 64, 66 and 68 are in fact made from the same piece as the body and are just bent into place. However, in other embodiments, which would still be considered a one-piece design, the tabs are welded onto the body.

Figure 4:
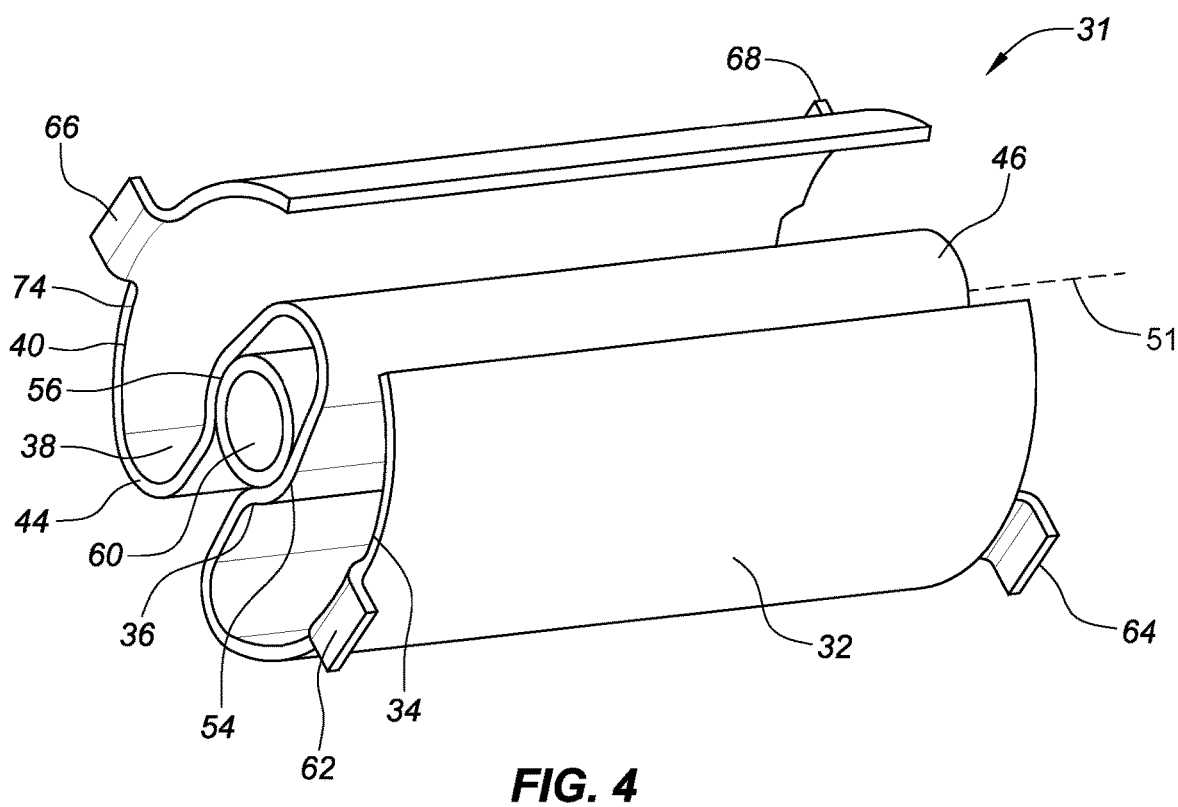
FIG. 4 illustrates a bushing design similar to FIG. 3 but with a small modification to the third concave arc.

FIG. 4, illustrates a bushing design similar to FIG. 3 but with a small modification to the third concave arc 46. As may be seen in FIG. 4, the third concave arc 46 does not sweep through as big an angle as the embodiment in FIG. 3. The third concave arc 46 in FIG. 4 sweeps through less than 180 degrees and thus, the first inside leg 36 and second inside leg 38 are diverging as they extend laterally across the body 32 from the third concave arc 46.

Figure 5:
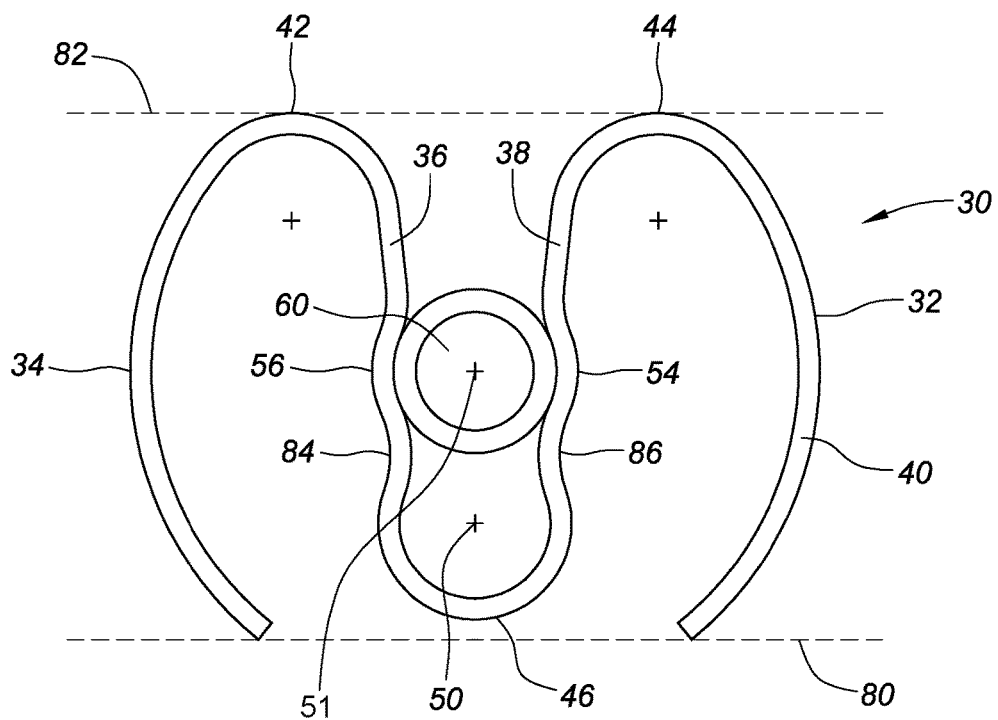
FIG. 5 illustrates a cross-sectional view of one embodiment of a bushing similar to the bushing of FIG. 3.

FIG. 5 illustrates a cross-sectional view of one embodiment of a bushing similar to the bushing illustrated in FIG. 3. In order to increase the understanding of the embodiments disclosed herein, the cross-section shown in FIG. 5 will be described using alternative language from what was used to describe FIG. 3. As may be appreciated from FIG. 3, each of the features described runs the full length of the bushing and the cross-section is consistent down the entire length of the bushing 30.

As may be seen in FIG. 5, the bushing 30 has a first concave portion 46 with a first radius on a first side 80 of the bushing 30. The concave portion 46 is an arc that can sweep through a variety of angles as explained previously. In the embodiment shown in FIG. 5, the concave portion 46 sweeps through an angle of 180 degrees or greater. The concave portion 46 curves around a longitudinal axis 50 that runs the length of the bushing 30.

In preferred embodiments, both a top side 84 and a bottom side 86 extend out laterally from the first concave portion 46 to an opposite side 82 of the bushing 30 from the first side 80. Once the top side 82 and bottom side 84 reach the opposite side 82, they each curve back on themselves to form a first convex portion 42 and second convex portion 44 on the second side of the bushing. The first convex portion 42 and second convex portion 44 are above and below the first concave portion 46 respectively. The radius of convex portions 42 and 44 may be any radius and the convex portion may sweep through any arc. However, in preferred embodiments, the convex portions sweep through an arc between 90 and 150 degrees and more preferably between 120 and 150 degrees. Regardless, the convex portions sweep through an arc of at least 90 degrees or more. The radius of convex portions 42 and 44 may be any radius but in a preferred embodiment the radius is about the same as the radius of the concave portion 46. In preferred embodiments, convex portions 42 and 44 are identical mirror images of each other.

After reaching the opposite side 82 and curving through the convex portions 42 and 44, both the top side and bottom side extend laterally back to the first side 84 of the bushing 30 in a first arc 34 and second arc 40 on a top 84 and bottom 86 of the bushing 30 respectively. As may be seen in FIG. 5, the first arc 34 and second arc 40 form the outer circumference of the bushing 30 around a central axis 51.

In the embodiment shown in FIG. 5, as the top 84 portion and bottom 86 portion of the bushing extends from the first concave portion 46 laterally across the bushing 30 to the second side 82, a third concave arc 56 and forth concave arc 54 extend longitudinally across the bushing 30 and are formed around the central axis 51 in the top side 84 and bottom side 86 respectively. The third concave arc 56 and fourth concave arc 54 form the rounded channel 60, which is used to hold the sensor, cable etc. In FIG. 5, a round object is shown held in the rounded channel 60 but, of course, is not part of the bushing 30.

In preferred embodiments, the third and fourth concave arcs 56 and 54 each have a radius around the central axis 51 approximately equal to the radius of the concave portion 46. In other embodiments, the radius used for the concave arcs 56 and 54 may be larger than the radius of the concave portion 46. In preferred embodiments, the third concave arc 56 and fourth concave arc 54 each have a flared lip on a first end of the bushing 30. Even more preferably, the third concave arc 56 and fourth concave arc 54 each have a flared lip on both ends of the bushing 30.

Figure 6:
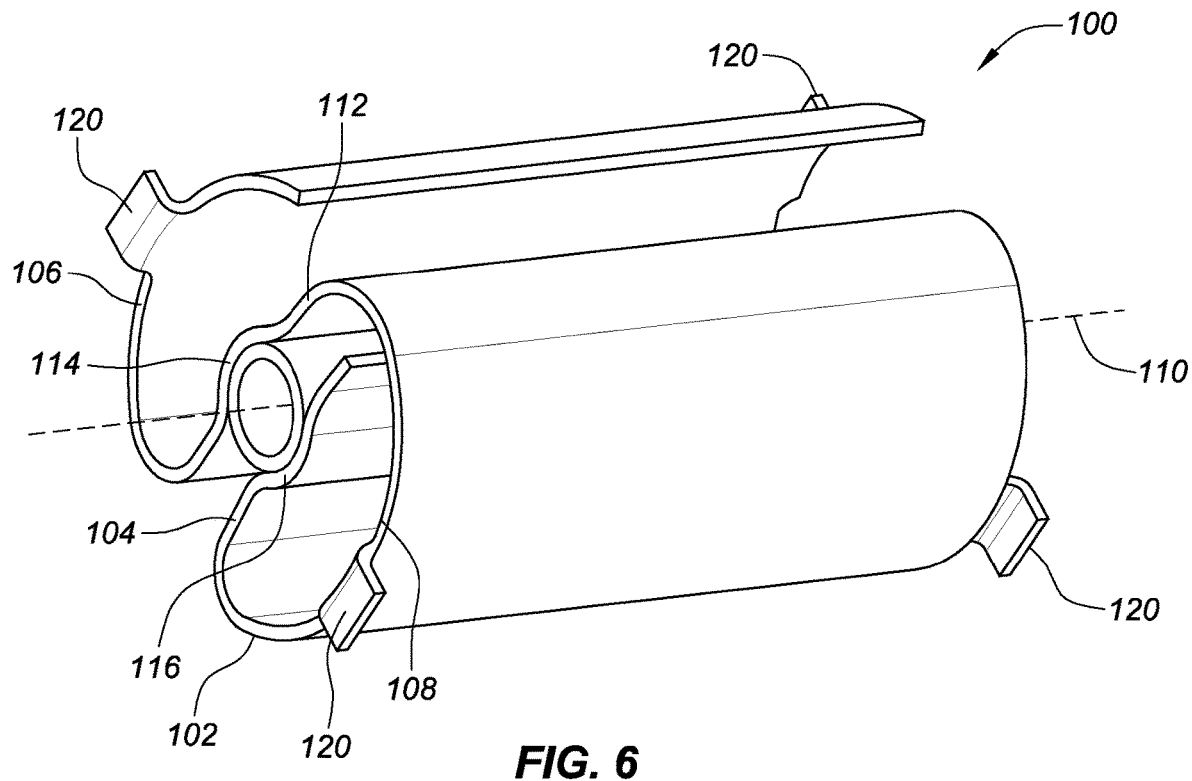
FIG. 6 illustrates another embodiment of a bushing made from a single piece of metal.

FIG. 6 illustrates another embodiment of a bushing 100 made from a single piece of metal. The embodiment of FIG. 6 has an "S" shaped cross-section with an additional piece that extends off the tail 102 of the "S". As may be seen in FIG. 6, the bushing 100 includes a first concave arc 106 and a second concave arc 108. The two arcs 106 and 108 curve around a central axis 110. The two arcs 106 and 108 form a majority of the circumference of the bushing 100. The first concave arc 106 forms the top portion of the "S" in the cross-section and the second concave arc 108 forms the bottom portion of the "S" in the cross-section.

The two concave arcs 106 and 108 are connected by the first central portion 112. The first central portion 112 and the second central portion 104 together form the rounded passage for holding the sensor, tubing, wires etc. While the first central portion 104 forms the center of the "S" in the cross-section, the second central portion 104 is an extension to the end of the "S" in the cross-section. Thus, the second central portion 104 is the portion of the cross-section that is not part of the "S" shape.

As may be seen in FIG. 6, the first central portion 112 and the second central portion 104 are parallel or approximately parallel to each other. Each of the first central portion 112 and the second central portion 104 have a concave arc 114 and 116 respectively. The concave arcs 114 and 116 curve around the central axis 110. The two concave arcs 114 and 116 define the rounded central channel used to hold the sensors, wires, cables etc.

As may be seen in FIG. 6, tabs 120 may be added to the outside edge in a similar fashion to the tabs described in FIG. 3. In addition, the concave arcs 114 and 116 may have flared edges to provide strain relief as described with respect to FIG. 3.

Figure 7:
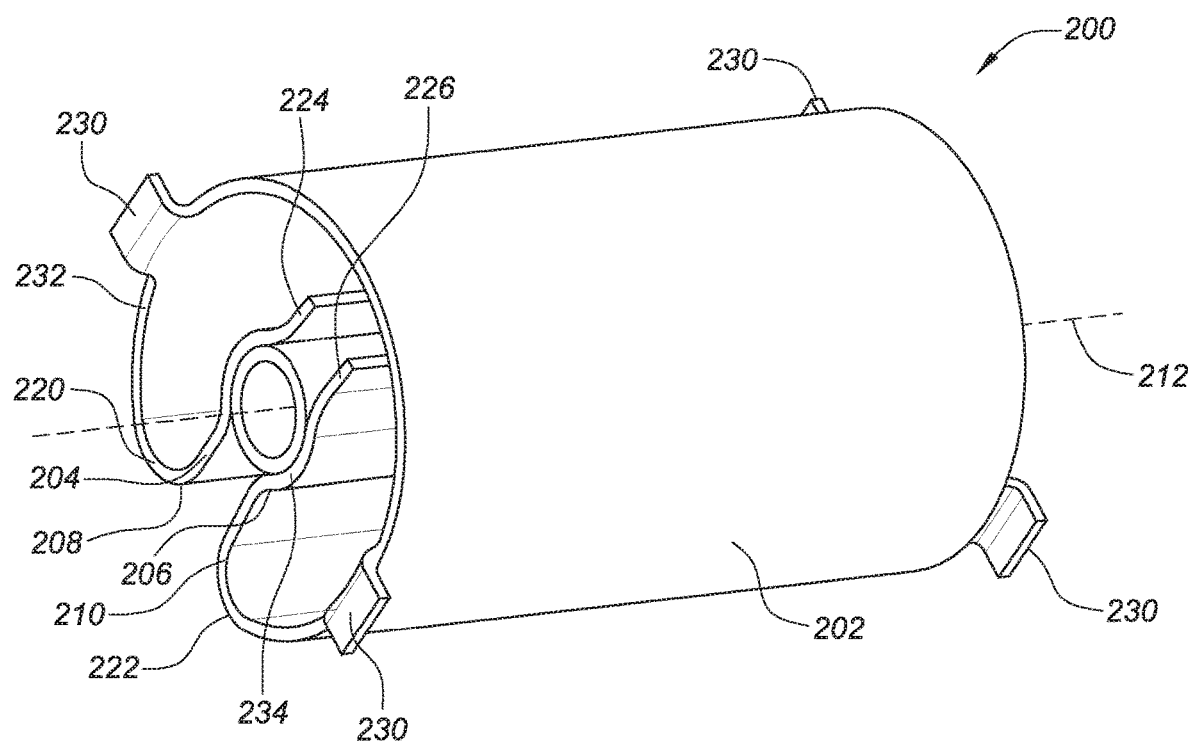
FIG. 7 illustrates another embodiment of a bushing.

FIG. 7 illustrates another embodiment of a bushing 200. The embodiment in FIG. 7 is comprised of one large arc 202 that wraps almost completely around the central axis 212. As may be seen in FIG. 7, the arc 202 sweeps through more than 320 degrees. In preferred embodiments, the arc 202 sweeps through 320 degrees or more. In yet other embodiments, the arc 202 sweeps through 340 degrees or more. The arc forms the exterior of the cylindrically shaped body 202 of the bushing 200.

Where the arc stops curving around the circumference of the body 202, the arc transitions into rounded corners 220 and 222 at each of its ends. The first rounded corner 220 transitions the arc 202 into the first central portion 224 and the second rounded corner 222 transitions the arc 202 into the second central portion 226. In the embodiment shown in FIG. 7, the first central portion 224 and the second central portion 226 are parallel and run from an exterior edge of the bushing 200 laterally across the bushing to the opposite side. In a preferred embodiment, the first rounded corner 220 and the second rounded corner 222 are mirror images of each other.

In the embodiment shown in FIG. 7, the first central portion 224 and second central portion 226 both terminate before reaching the arc 202. However, in some embodiments, the central portions 224 and 226 may terminate into the arc 202.

Similar to the embodiment shown in FIG. 6, each of the central portions 224 and 226 have a concave arc 232 and 234 respectively. These opposing arcs form the central passage which holds the sensor, wire, cable etc.

As may be seen in FIG. 7, tabs 230 may be added to the outside edge in a similar fashion to the tabs described in FIG. 3. In addition, the concave arcs 232 and 234 may have flared edges to provide strain relief as described with respect to FIG. 3.

Figure 8:
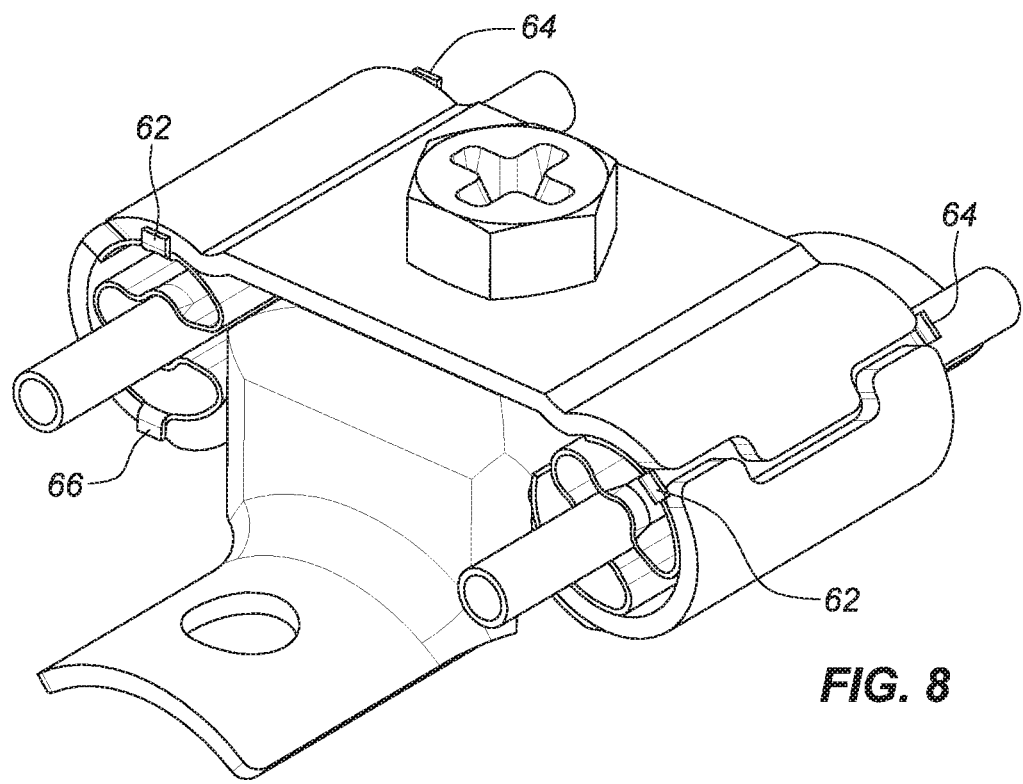
FIG. 8 illustrates a dual clamp with an embodiment of a bushing similar to the one from FIG. 3 assembled into both slots of the clamp.

FIG. 8 illustrates a dual clamp with an embodiment of a bushing similar to the one from FIG. 3 assembled into both slots of the clamp. As may be seen in FIG. 8, the length of the bushings is designed to be approximately the same length as the clamps so that just the tabs 62, 64 and 66 stick out. In this configuration, the tabs 62, 64, and 66 (68 not shown) prevent the bushing from sliding laterally within the clamp.

Figure 9:
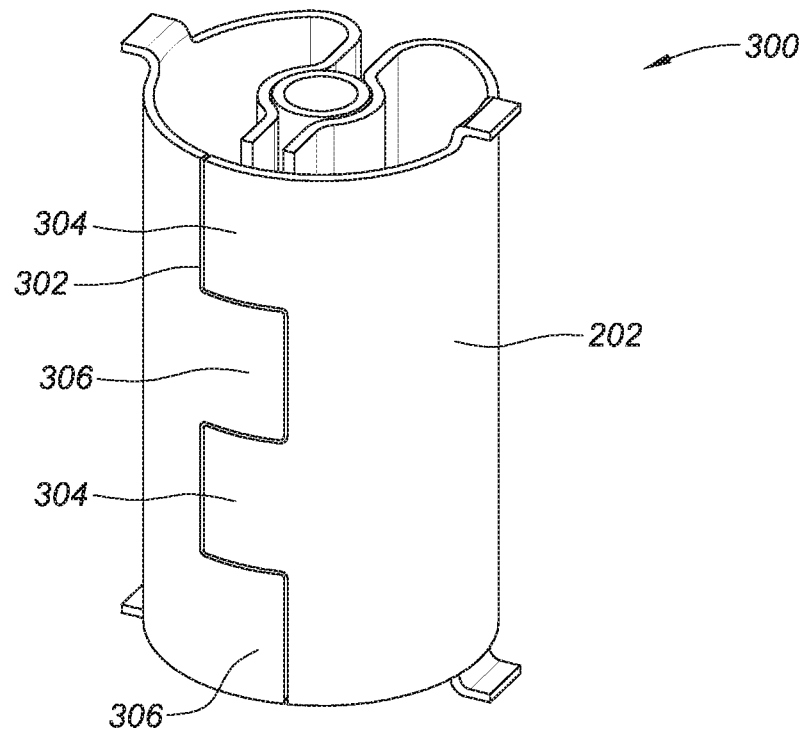
FIG. 9 illustrates an embodiment of a bushing similar to the embodiment of FIG. 7, but built with a two-piece construction.

FIG. 9 illustrates an embodiment 300 of a bushing similar to the embodiment of FIG. 7, but built with a two-piece construction. As may be seen in FIG. 9, a seam 302 extends down the longitudinal length of arc 202. The seam 302 defines the two pieces of the bushing 300. As may be appreciated from FIG. 9, the seam is tooth shaped and each piece of bushing 300 has a tooth shaped interface. The left side has teeth 306 that fit into the grooves of the right side and the right side has teeth 304 that fit into grooves on the left side. In other embodiments, other interfaces may be used to join the two pieces and it is not required to use a tooth shaped interface in two-piece constructions.

The embodiments described herein are exemplary and are not meant to limit the scope of the claims as claimed below. As one skilled in the art will appreciate, many modifications and substitutions to the embodiments disclosed herein are possible without departing from the spirit of the embodiments disclosed.

What is claimed is:

1. A bushing comprising:
a single piece of metal formed into a first concave portion with a first radius on a first side of the bushing wherein the concave portion includes at least 180 degrees of curvature around a longitudinal axis and wherein both a top side and bottom side of the single piece of metal extends out from the first concave portion laterally to an opposite side of the bushing from the first side and wherein both the top side and bottom side of the single piece of metal curves back on itself to form a first and second convex portion on the second side of the bushing above and below the first concave portion respectively and wherein the first and second convex portions each have greater than 90 degrees of curvature and wherein both the top side and bottom side of the single piece of metal extends laterally back to the first side of the bushing in a first arc and second arc on a top and bottom of the bushing respectively wherein the first arc and second arc form the outer circumference of the bushing around a central axis, wherein the central axis is a center of curvature for the first arc and second arc;
and wherein as each portion of the single piece of metal extends from the first concave portion laterally across the bushing to the second side, a third concave arc and fourth concave arc extend longitudinally across the bushing and are formed around the central axis in the top side and bottom side respectively, and wherein the central axis is a center of curvature for the third concave arc and fourth concave arc.

2. The bushing of claim 1 wherein the metal is bent into the shape described.

3. The bushing of claim 1, wherein the metal is extruded in the shape described.

4. The bushing of claim 1, further comprising a first tab and a second tab on opposite ends of the bushing and extending outwards from an outside edge of the first arc.

5. The bushing of claim 4, further comprising a third tab and a fourth tab on opposite ends of the bushing and extending outwards from an outside edge of the second arc.

6. The bushing of claim 1, wherein the third and fourth concave arcs each have a radius around the central axis approximately equal to the first radius.

7. The bushing of claim 1, wherein the third concave arc and fourth concave arc each have a flared lip on a first end of the bushing.

8. The bushing of claim 7, wherein the third concave arc and fourth concave arc each have a flared lip on a second end of the bushing opposite from the first end.

9. A bushing comprising:
a body formed from a single piece of metal, the body having an "M" shaped cross-section with a first outer leg, second outer leg, first inner leg and second inner leg, wherein the first outer leg and second outer leg are both concave arcs about a central axis and form an outer circumference of the body, and wherein the central axis is a center of curvature for the first outer leg and second outer leg, and wherein the first inner leg and second inner leg each have an arc formed in a length of the first inner leg and second inner leg to create a rounded channel that extends a longitudinal length of the body along the central axis, and wherein the central axis is a center of curvature for the are in the first inner leg and second inner leg;
and wherein the first inner leg and second inner leg transition between each other in a third concave arc.

10. The bushing of claim 9, wherein the third concave arc turns 180 degrees or more around a longitudinal axis.

11. The bushing of claim 9, wherein the second inner leg transitions into the second outer leg in a first rounded curve and the first inner leg transitions into the first outer leg in a second rounded curve.

12. The bushing of claim 9, further comprising a first tab and a second tab on opposite ends of the first outside leg and extending outwards from a first outside edge of the first outside leg and a third tab and a fourth tab on opposite ends of the second outside leg and extending outwards from a second outside edge of the second outside leg.

13. The bushing of claim 10, wherein the radius of the rounded channel and the radius of the third concave arc are about the same.

14. The bushing of claim 9, wherein the rounded channel has a flared lip on both ends of the body.

15. A bushing comprising:
a rounded body having an "M" shaped cross-section with a first outer leg, second outer leg, first inner leg and second inner leg, wherein the first outer leg and second outer leg are both concave arcs about a central axis and form an outer circumference of the rounded body, and wherein the central axis is a center of curvature for the first outer leg and second outer leg, and wherein the first inner leg and second inner leg each have an arc formed in a length of the first inner leg and the second inner leg to create a rounded channel that extends a longitudinal length of the rounded body along the central axis, and wherein the central axis is a center of curvature for the arc in the first inner leg and second inner leg;
and wherein the first inner leg and second inner leg transition between each other in a third concave arc; and
a first tab and a second tab on opposite ends of the first outside leg and extending outwards from a first outside edge of the first outside leg and a third tab and a fourth tab on opposite ends of the second outside leg and extending outwards from a second outside edge of the second outside leg.

16. The bushing of claim 15, wherein the rounded body is made from a single piece of bent metal.

17. The bushing of claim 15, wherein the rounded channel has a flared lip on both ends of the rounded body.

18. The bushing of claim 15, wherein the radius of the rounded channel and the radius of the third concave arc are about the same.

19. The bushing of claim 15, wherein the third concave arc turns 180 degrees or more around a longitudinal axis.

* * * * *